United States Patent
Jackson

(10) Patent No.: US 10,337,639 B2
(45) Date of Patent: Jul. 2, 2019

(54) APPARATUS TO BIAS A MOVEABLE TUBE TOWARDS A SEAL

(71) Applicant: Fisher Controls International LLC, Marshalltown, IA (US)

(72) Inventor: Trenton Frank Jackson, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 100 days.

(21) Appl. No.: 15/678,646

(22) Filed: Aug. 16, 2017

(65) Prior Publication Data

US 2019/0056042 A1 Feb. 21, 2019

(51) Int. Cl.
*F16K 31/126* (2006.01)
*F16K 27/02* (2006.01)

(52) U.S. Cl.
CPC .......... *F16K 31/1262* (2013.01); *F16K 27/02* (2013.01); *F16K 31/1264* (2013.01)

(58) Field of Classification Search
CPC ............. F16K 31/1264; F16K 31/1262; F16K 31/126; F16K 31/1226; F16K 31/1221; F16K 31/122; F16K 31/163; F16K 31/165; F16K 31/16; F16K 27/02; F16K 27/08; Y10T 137/5994; Y10T 137/781; Y10T 137/7811; Y10T 137/7827; Y10T 137/7831; Y10T 137/7836; Y10T 137/8663; Y10T 137/86702

USPC ......................................... 251/61.5, 63.6, 62
See application file for complete search history.

(56) References Cited

U.S. PATENT DOCUMENTS

| | | | | |
|---|---|---|---|---|
| 2,783,746 A | * | 3/1957 | Boteler | F15B 15/10 92/110 |
| 8,312,892 B2 | * | 11/2012 | Wilke | F16K 31/1262 137/312 |
| 8,714,515 B2 | * | 5/2014 | Nannan | F15B 9/03 137/553 |
| 9,291,280 B2 | * | 3/2016 | McCarty | F16K 27/08 |
| 9,458,947 B2 | * | 10/2016 | Arnold | F16K 31/163 |
| 9,599,250 B2 | * | 3/2017 | Gossett | F16K 31/126 |
| 9,970,567 B2 | * | 5/2018 | Arnold | F16K 31/163 |
| 2017/0002952 A1 | * | 1/2017 | Arnold | F16K 31/163 |

\* cited by examiner

*Primary Examiner* — Reinaldo Sanchez-Medina
*Assistant Examiner* — David Colon-Morales
(74) *Attorney, Agent, or Firm* — Hanley, Flight & Zimmerman, LLC

(57) ABSTRACT

Apparatus are disclosed to bias a tube towards a seal. An example apparatus includes a pneumatic actuator having a diaphragm plate, a yoke housing, and a tube. The tube conveys pressurized fluid between the yoke housing and the diaphragm plate, wherein a first end of the tube extends through a first seal gland in the diaphragm plate to form a seal against an outer surface of the tube and a second end of the tube extends through a second seal gland in the yoke housing to form a seal against the outer surface of the tube. The first end of the tube has a first cross-sectional area that is greater than a second cross-sectional area of the second end of the tube to bias the tube toward the yoke housing during operation of the pneumatic actuator.

20 Claims, 4 Drawing Sheets

APPARATUS TO BIAS A MOVEABLE TUBE TOWARDS A SEAL

FIELD OF THE DISCLOSURE

This disclosure relates generally to pneumatic actuator components, and more particularly, to apparatus to bias a moveable tube towards a seal.

BACKGROUND

Diaphragm actuators use pressurized air to actuate various process components. For example, pressurized air moves a diaphragm plate to actuate a process component such as a valve. Conveying pressurized fluid to the cavity above the diaphragm plate forces the diaphragm plate downward, thereby actuating the process component. Conversely, venting the cavity above the diaphragm or conveying high pressurized fluid to the cavity below the diaphragm reverses the actuation of the process component.

SUMMARY

An example pneumatic actuator includes a diaphragm plate, a yoke housing, and a tube. The tube is to convey pressurized fluid between the yoke housing and the diaphragm plate, wherein the first end of the tube extends through a first seal gland in the diaphragm plate to form a seal against an outer surface of the tube and a second end of the tube extends through a second seal gland in the yoke housing to form a seal against the outer surface of the tube. The tube also includes the first end of the tube having a first cross-sectional area that is greater than a second cross-sectional area of the second end of the tube to bias the tube toward the yoke housing during operation of the pneumatic actuator.

An example pneumatic actuator includes a diaphragm plate, a yoke housing, a tube to convey pressurized fluid between the yoke housing and the diaphragm plate, and means for biasing the tube towards the yoke housing during operation of the pneumatic actuator.

Yet another example pneumatic actuator includes a tube to convey pressurized fluid between a yoke housing and a diaphragm plate having a first end and a second end opposite the first end, wherein the first end of the tube has a first cross-sectional area that is greater than a second cross-sectional area of the second end of the tube to bias the tube toward the yoke housing during operation of the pneumatic actuator.

Figure 1:
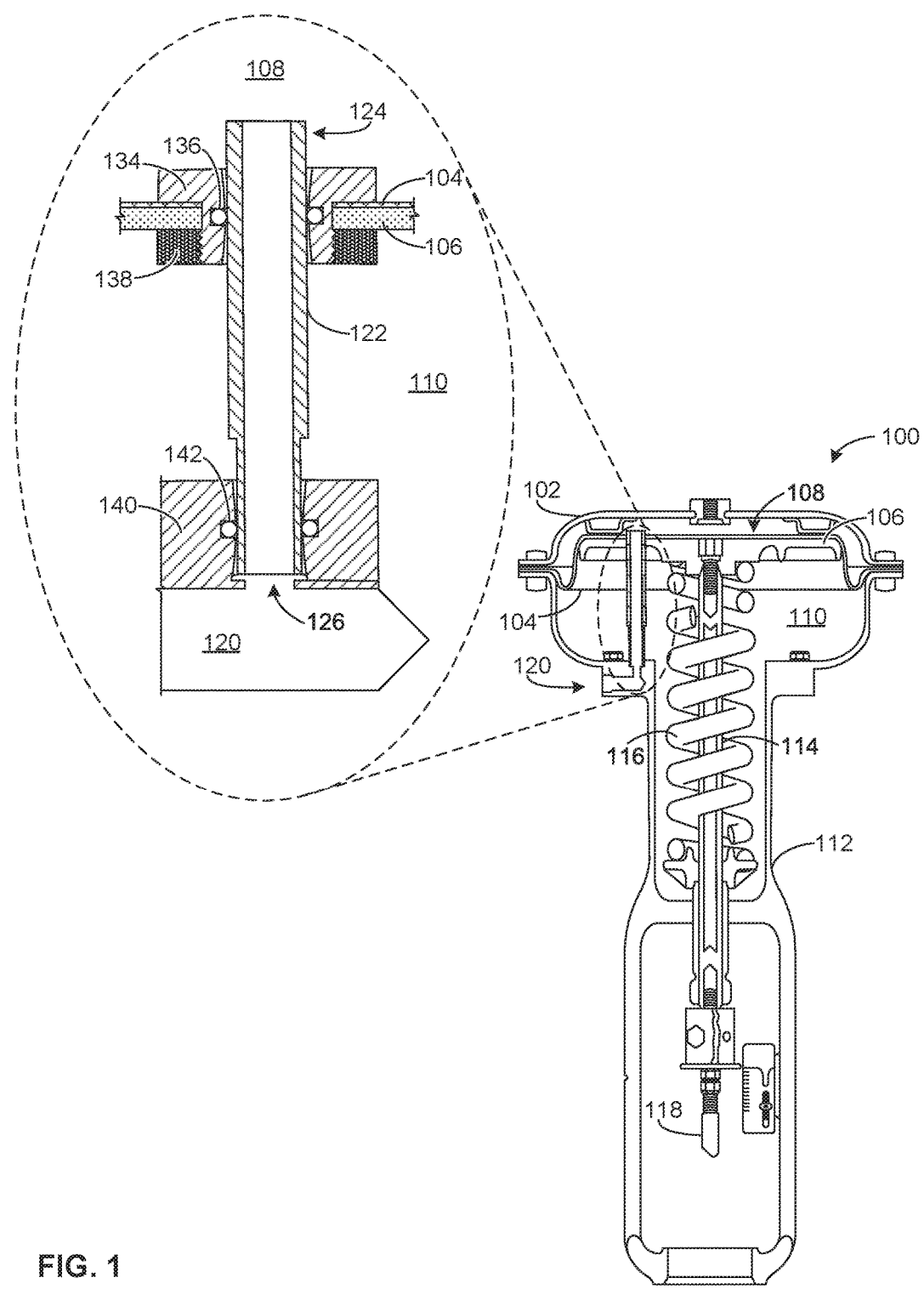
FIG. 1 illustrates an example pneumatic actuator in which the examples disclosed herein may be implemented.

The figures are not to scale. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Pneumatic actuators (e.g., diaphragm actuators, piston actuators, etc.) use pressurized fluid to actuate various process components, such as valves. For example, pressurized air conveyed to a diaphragm casing causes a diaphragm plate to actuate a process component. Conveying pressurized fluid to a cavity on a first side of the diaphragm can force the diaphragm plate in a first direction to actuate the process component. Conversely, venting the cavity on the first side of the diaphragm or conveying pressurized fluid to a cavity on a second side of the diaphragm reverses the actuation of the process component.

The diaphragm casing is typically connected to a yoke housing. The yoke housing contains an actuator stem and an actuator spring. For example, the actuator stem conveys the force applied to the diaphragm plate to the process component, such as a valve. The actuator stem is connected to the diaphragm plate and passes through the yoke housing. The actuator stem typically includes a stem connector to connect to the process component. Additionally, the actuator spring helps control the diaphragm plate and can return the diaphragm plate to an unactuated position. For example, the actuator spring is connected on one end to the yoke housing via a spring seat and on the other end to the diaphragm plate.

Within the diaphragm casing, the diaphragm plate moves perpendicular to the upper and lower surfaces of the diaphragm plate to actuate the process component. However, the diaphragm plate may also be free to move laterally. As a result, components interacting with the diaphragm plate are designed to slide and pivot to accommodate the movements of the diaphragm plate. For example, a tube to convey pressurized fluid between the yoke housing and the diaphragm plate may be configured to pivot about a first seal gland in the diaphragm plate and a second seal gland on the yoke housing. In some known valves, the tube can become dislodged from the second seal gland. As a result, the tube can no longer convey pressurized fluid to the upper cavity.

In accordance with the present disclosure, the tube includes means for biasing the tube towards the second seal gland, thereby preventing the tube from dislodging from the second seal gland. In some examples, the means for biasing the tube towards the yoke housing include physical structures such as structural characteristics of the tube that produce a force differential between a first end and a second end of the tube. For example, the tube may have a greater surface area on a first end relative to a second end adjacent the yoke housing to create a force differential to bias the tube towards the yoke housing.

FIG. 1 illustrates an example pneumatic actuator 100 in which the examples disclosed herein may be implemented. In the illustrated example, the pneumatic actuator 100 is a diaphragm actuator. The example pneumatic actuator 100 includes a diaphragm casing 102 including a diaphragm 104 and a diaphragm plate 106. The diaphragm plate 106 is a rigid plate disposed on a non-rigid, non-permeable diaphragm 104. For example, the diaphragm 104 divides the diaphragm casing 102 into a first cavity 108 and a second cavity 110. In some examples, pressurization of the first cavity 108 creates a pressure differential between the first cavity 108 and the second cavity 110. This pressure differential between the first and the second cavity 108, 110 actuates the pneumatic actuator 100 by increasing the volume of the first cavity 108 and forcing the diaphragm plate 106 into the volume of the second cavity 110.

The diaphragm casing 102 is connected to an example yoke housing 112. The yoke housing 112 includes a stem 114 and a spring 116. For example, the stem 114 is connected to the diaphragm plate 106 and an actuator connector 118. In the illustrated example, the stem 114 is a rigid rod. However, in other examples, the stem 114 is another rigid structure. In some examples, the example spring 116 is positioned around the stem 114. However, in other examples, the spring 116 is positioned adjacent the stem 114. Additionally or alternatively, the spring 116 may be multiple springs.

Additionally, disposed in the yoke housing 112, is a pressurized fluid connection 120. For example, the pressurized fluid connection 120 may receive a pressurized fluid from a pressurized fluid source, a fluid pump, etc. In fluid communication with the pressurized fluid connection 120 is a tube 122 to convey pressurized fluid between the yoke housing 112 and the diaphragm plate 106. In the illustrated example, a first end 124 of the tube is fluidly coupled to the first cavity 108 and a second end 126 of the tube is fluidly coupled to the pressurized fluid connection 120.

The example tube 122 extends through a first seal gland 134 and the tube 122 is coupled to the first seal gland 134 via a first O-ring 136. In the illustrated example, the first seal gland 134 is disposed on the diaphragm 104 and the diaphragm plate 106, and is secured to the diaphragm plate 106 with a gland nut 138. Additionally, the example tube 122 extends through a second seal gland 140, and the tube 122 is coupled to the second seal gland 140 via a second O-ring 142. In the example of FIG. 1, the first O-ring 136 fluidly partitions the first cavity 108 from the second cavity 110, and the second O-ring 142 fluidly partitions the second cavity 110 from the pressurized fluid connection 120. In other examples, the first and second O-rings 136, 142 can be a different sealing component (e.g., an elastomer sleeve, rolling diaphragm, elastomer sealing lip, etc.).

Figure 2:
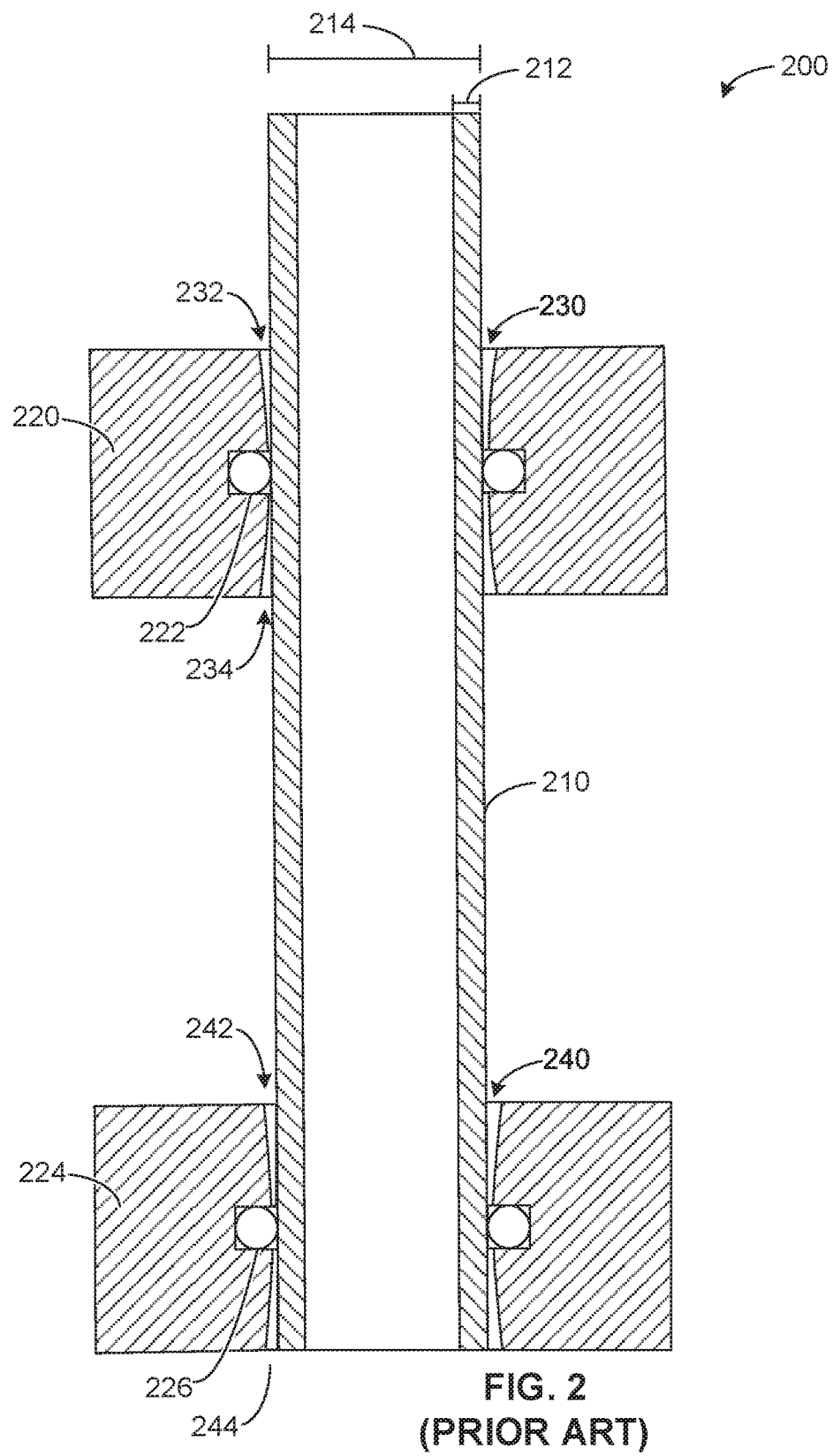
FIG. 2 illustrates a prior art tube disposed in a pneumatic actuator.

FIG. 2 illustrates a known tube connection 200 that may be disposed in the example pneumatic actuator 100 of FIG. 1. In the illustrated example of FIG. 2, a tube 210 has a cylindrical shape including wall thickness 212 and an outer diameter 214. The example thickness 212 and outer diameter 214 are substantially uniform across a length of the tube 210. In the illustrated example, the tube 210 extends through a first seal gland 220 and the tube 210 couples to the first seal gland 220 via a first O-ring 222. Additionally, the tube 210 extends through a second seal gland 224 and the tube couples to the second seal gland 224 via a second O-ring 226.

The example tube 210 does not include means to bias the tube 210 towards the yoke housing 112 of FIG. 1. For example, during operation of the pneumatic actuator 100, the tube 210 can slide through the first seal gland 220 and the second seal gland 140. Additionally or alternatively, the tube 210 can pivot about the first seal gland 220 and the second seal gland 224. In some known pneumatic actuators, the tube 210 can slide upward in the orientation of FIG. 2 and decouple from the second seal gland 224. In such examples, the first cavity 108 (FIG. 1) and the second cavity 110 (FIG. 1) are no longer fluidly partitioned, and the example pneumatic actuator 100 can no longer be actuated via a pressure differential between the first and second cavities 108, 110.

In the illustrated example, the first seal gland 220 includes a first passageway 230 that widens or flares from the first O-ring 222 toward opposing apertures 232, 234 of the first passageway 230. Similarly, the second seal gland 224 includes a second passageway 240 that widens or flares from the second O-ring 226 toward opposing apertures 242, 244. Thus, during operation of the pneumatic actuator 100 of FIG. 1, the first passageway 230 of the first seal gland 220 and the second passageway 240 of the second seal gland 224 are shaped to enable lateral movement of the tube 210 to pivot about the first O-ring 222 and the second O-ring 226 when the diaphragm plate 106 moves laterally. Thus, the flared shapes of the passageways 230, 240 can prevent damage to the tube 210 during lateral movement of the diaphragm plate 106 (FIG. 1).

Figure 3:
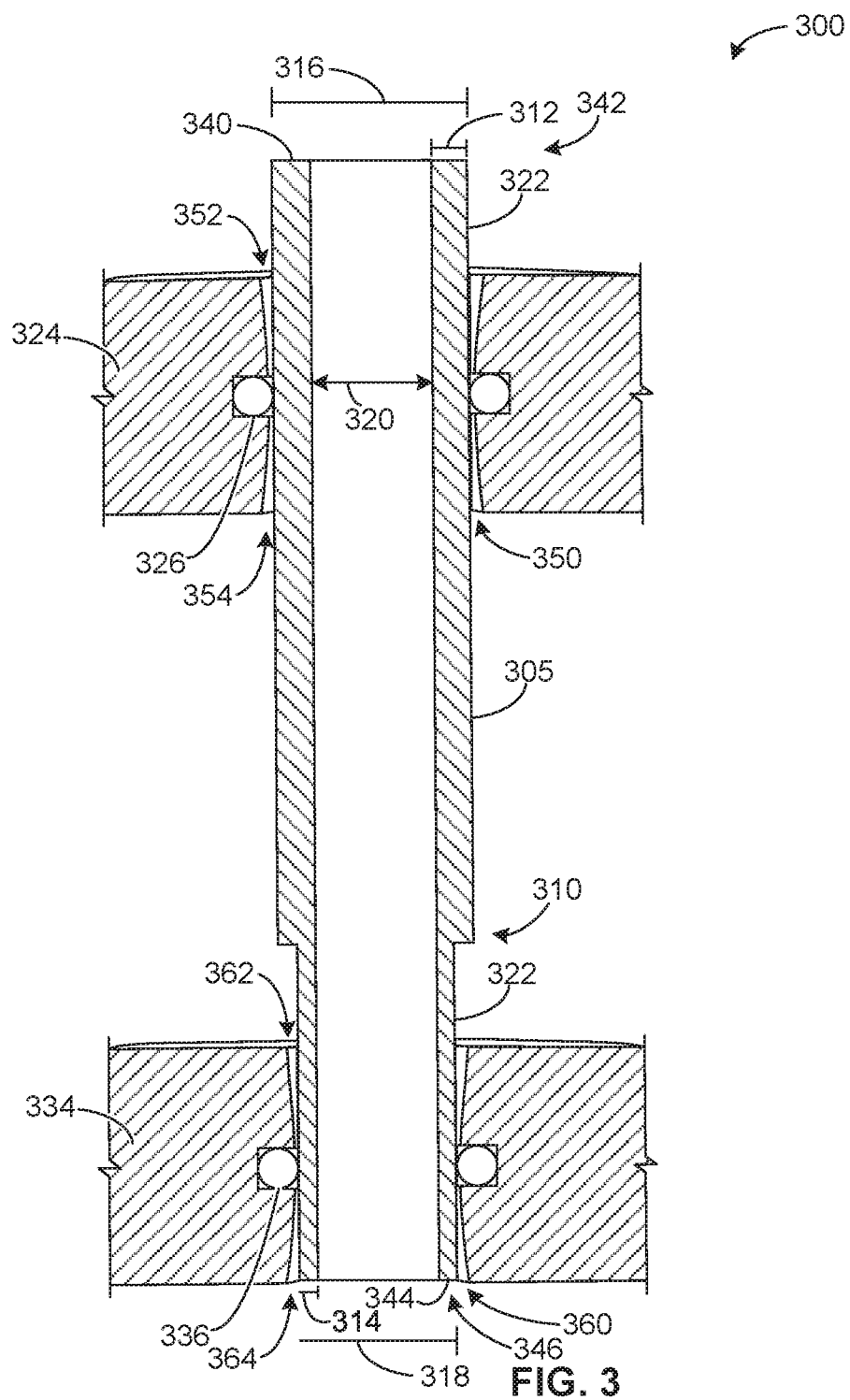
FIG. 3 illustrates an example tube disposed in a pneumatic actuator, the tube having a stepped change in cross-sectional area.

FIG. 3 illustrates an example tube connection 300 that may be disposed in the pneumatic actuator 100 of FIG. 1. The example of FIG. 3 includes an example tube 305 having a step change 310 in cross-sectional area. In the illustrated example of FIG. 3, the tube 305 has a first wall thickness 312 and a second wall thickness 314, a first outer diameter 316 and a second outer diameter 318, and an inner diameter 320. In the example of FIG. 3, the tube 305 has a cylindrical shape. However, in other examples, the tube 305 can be a different shape. In the illustrated example, an outer surface 322 of the tube 305 couples with a first seal gland 324 via a first O-ring 326 to form a seal, and the outer surface 322 additionally couples with a second seal gland 334 via a second O-ring 336 to form a seal. As a result of the step change 310, the first outer diameter 316 is larger than the second outer diameter 318. However, the inner diameter 320 does not change in the example tube 305. In other examples, the inner diameter 320 may vary across the length of the tube 305.

In accordance with the present disclosure, the first thickness 312 is greater than the second thickness 314 and, as a result, a first surface area 340 of a first end 342 of the tube 305 is greater than a second surface area 344 of a second end 346 of the tube 305. In the illustrated example of FIG. 3, the tube 305 has a step change in cross-sectional area between a first cross-sectional area of the first end 342 and a second cross-sectional area of the second end 346. However, in other examples, the tube 305 may have a continuous (e.g., tapered) change in cross sectional area between the first cross-sectional area and the second cross-sectional area. During operation of the pneumatic actuator 100 (FIG. 1), the pressure acting on the first surface area 340 induces a greater force (e.g., a force difference) than the pressure acting on the second surface area 344 due to a difference in the surface areas. As a result, the tube 305 is biased towards the second seal gland 334 and the yoke housing 112 (FIG. 1).

In the illustrated example of FIG. 3, the first seal gland 324 includes a first passageway 350 that widens or flares from the first O-ring 326 toward opposing apertures 352, 354 of the first passageway 350. Similarly, the second seal gland 334 includes a second passageway 360 that widens or flares from the second O-ring 336 toward opposing apertures 362, 364 of the second passageway 360. Thus, the first and second passageways 350, 360 can prevent damage to the example tube 305 during lateral movement of the diaphragm plate 106 (FIG. 1).

Figure 4:
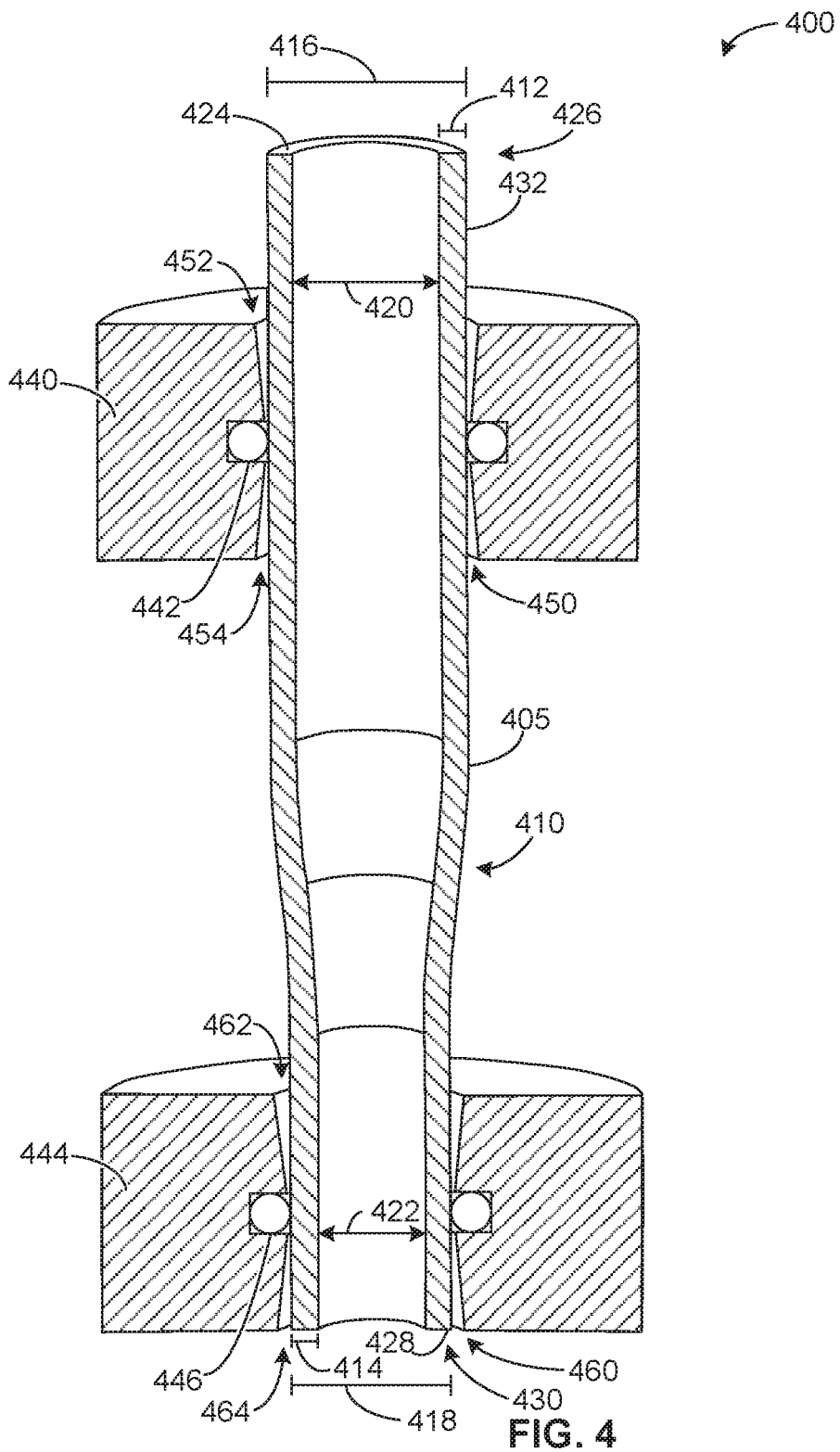
FIG. 4 illustrates an example tube disposed in a pneumatic actuator, the tube having a tapered change in cross-sectional area.

FIG. 4 illustrates an example tube connection 400 that may be disposed in the pneumatic actuator 100 of FIG. 1. The example of FIG. 4 includes an example tube 405 having a tapered change 410 in cross-sectional area. In the illustrated example, the tube 405 includes a first wall thickness 412 and a second wall thickness 414, a first outer diameter 416 and a second outer diameter 418, and a first inner diameter 420 and a second inner diameter 422. In the example of FIG. 4, the tube 405 has a cylindrical shape. However, in other examples, the tube 405 can be a different shape. In some examples, the first thickness 412 and the second thickness 414 are substantially similar and, as a result a first surface area 424 of a first end 426 and a second surface area 428 of a second end 430 are substantially different. In other examples, the first surface area 424 and the second surface area 428 are manufactured to be substantially similar.

In the illustrated example, an outer surface 432 of the tube 405 couples with a first seal gland 440 via a first O-ring 442 to form a seal, and the outer surface 432 also couples with a second seal gland 444 via the second O-ring 446 to form a seal. As a result of the example tapered change 410, the first outer diameter 416 and the first inner diameter 420 are larger than the second outer diameter 418 and the second inner diameter 422 respectively. In some examples, the first thickness 412 is constant across the length of the tube 405, and the first thickness 412 is the same as the second thickness 414. In other examples, the first thickness 412 is different from the second thickness 414.

In accordance with the present disclosure, the tube 405 is biased towards the second seal gland 444 and the yoke housing 112 (FIG. 1), as a result of the force difference induced by the pressurized fluid acting upon a difference in surface area between the first and second surface area 424, 428. Additionally, the pressurized fluid imparts a force to the tapered change 410, further biasing the tube towards the second seal gland 444 and the yoke housing 112 (FIG. 1).

In the illustrated example of FIG. 4, the first seal gland 440 includes a first passageway 450 that widens or flares from the first O-ring 442 toward opposing apertures 452, 454. Similarly, the second seal gland 444 includes a second passageway 460 that widens or flares from the second O-ring 446 toward the opposing apertures 462, 464. Thus, the flared shapes of the first and second passageways 450, 460 can prevent damage to the example tube 405 during lateral movement of the diaphragm plate 106 (FIG. 1).

From the foregoing, it will be appreciated that example apparatus and articles of manufacture have been disclosed that bias a pneumatic actuator tube to remain coupled to a first and second seal gland without adversely affecting the normal operation of the pneumatic actuator. Additionally, while the examples disclosed herein are described in connection with pneumatic actuators, the examples disclosed herein can likewise be implemented with any other device including a tube slidably and pivotably coupled to a first and second seal.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A pneumatic actuator comprising:
   a diaphragm plate;
   a yoke housing; and
   a tube to convey pressurized fluid between the yoke housing and the diaphragm plate, wherein a first end of the tube extends through a first seal gland in the diaphragm plate to form a seal against an outer surface of the tube and a second end of the tube extends through a second seal gland in the yoke housing to form a seal against the outer surface of the tube, and wherein the first end of the tube has a first cross-sectional area that is greater than a second cross-sectional area of the second end of the tube to bias the tube toward the yoke housing during operation of the pneumatic actuator.

2. The pneumatic actuator of claim 1, wherein the tube has a step change in cross-sectional area between the first cross-sectional area and the second cross-sectional area.

3. The pneumatic actuator of claim 1, wherein the tube has a tapered change in cross-sectional area between the first cross-sectional area and the second cross-sectional area.

4. The pneumatic actuator of claim 1, wherein the first end of the tube is slidably coupled to the first seal gland and the second seal gland.

5. The pneumatic actuator of claim 1, wherein a first passageway of the first seal gland and a second passageway of the second seal gland are shaped to enable lateral movement of the tube.

6. The pneumatic actuator of claim 5, wherein the first seal gland or the second seal gland includes an O-ring.

7. The pneumatic actuator of claim 1, wherein the tube has a cylindrical shape.

8. A pneumatic actuator comprising:
   a diaphragm plate;
   a yoke housing;
   a tube to convey pressurized fluid between the yoke housing and the diaphragm plate; and
   means for biasing the tube toward the yoke housing during operation of the pneumatic actuator.

9. The pneumatic actuator of claim 8, wherein the tube has a step change in cross-sectional area between a first cross-sectional area of a first end and a second cross-sectional area of a second end.

10. The pneumatic actuator of claim 8, wherein the tube has a tapered change in cross-sectional area between a first cross-sectional area of a first end and a second cross-sectional area of a second end.

11. The pneumatic actuator of claim 8, wherein the means for biasing the tube toward the yoke housing is a difference in surface areas between a first end and a second end.

12. The pneumatic actuator of claim 8, wherein the tube has a cylindrical shape.

13. The pneumatic actuator of claim 8, wherein a first passageway of a first seal gland and a second passageway of a second seal gland are shaped to enable lateral movement of the tube.

14. The pneumatic actuator of claim 13, wherein the first seal gland or the second seal gland includes an O-ring.

15. A pneumatic actuator comprising:
   a tube to convey pressurized fluid between a yoke housing and a diaphragm plate having a first end and a second end opposite the first end, wherein the first end of the tube has a first cross-sectional area that is greater than a second cross-sectional area of the second end of the tube to bias the tube toward the yoke housing during operation of the pneumatic actuator.

16. The pneumatic actuator of claim 15, wherein the tube has a step change in cross-sectional area between the first cross-sectional area and the second cross-sectional area.

17. The pneumatic actuator of claim 15, wherein the tube has a tapered change in cross-sectional area between the first cross-sectional area and the second cross-sectional area.

18. The pneumatic actuator of claim 15, wherein the pressurized fluid conveys a first force on the first end and a second force on the second end, the first force greater than the second force.

19. The pneumatic actuator of claim 15, wherein a first passageway of a first seal gland and a second passageway of a second seal gland are shaped to enable lateral movement of the tube.

20. The pneumatic actuator of claim 19, wherein the first seal gland or the second seal gland includes an O-ring.

\* \* \* \* \*